United States Patent
Slipko et al.

(10) Patent No.: US 11,095,937 B2
(45) Date of Patent: Aug. 17, 2021

(54) METHOD AND DEVICE FOR SECURE VIDEO PROCESSING

(71) Applicant: Liberty Global Europe Holding B.V., Schiphol-Rijk (NL)

(72) Inventors: Roman Slipko, Schiphol-Rijk (NL); Wojciech Lazarski, Schiphol-Rijk (NL)

(73) Assignee: Liberty Global Europe Holding B.V., Schiphol-Rijk (NL)

(*) Notice: Subject to any disclaimer, the term of this patent is extended or adjusted under 35 U.S.C. 154(b) by 0 days.

(21) Appl. No.: 16/621,264

(22) PCT Filed: Jun. 12, 2018

(86) PCT No.: PCT/EP2018/065536
§ 371 (c)(1),
(2) Date: Dec. 11, 2019

(87) PCT Pub. No.: WO2018/229066
PCT Pub. Date: Dec. 20, 2018

(65) Prior Publication Data
US 2020/0112765 A1 Apr. 9, 2020

(30) Foreign Application Priority Data

Jun. 13, 2017 (EP) .................................. 17175764

(51) Int. Cl.
*H04N 21/44* (2011.01)
*H04N 21/435* (2011.01)

(52) U.S. Cl.
CPC ..... *H04N 21/44004* (2013.01); *H04N 21/435* (2013.01)

(58) Field of Classification Search
CPC ........... H04N 21/44004; H04N 21/435; H04N 21/4435; H04N 21/4405
See application file for complete search history.

(56) References Cited

U.S. PATENT DOCUMENTS

| | | | |
|---|---|---|---|
| 2013/0002693 A1* | 1/2013 | Nara | H04N 21/4334 345/531 |
| 2013/0305342 A1 | 11/2013 | Kottilingal et al. | |
| 2014/0053186 A1 | 2/2014 | Rodgers | |
| 2014/0314233 A1 | 10/2014 | Evans et al. | |

(Continued)

*Primary Examiner* — John R Schnurr
(74) *Attorney, Agent, or Firm* — N.V. Nederlandsch Octrooibureau; Catherine A. Shultz; Katelyn J. Bernier

(57) ABSTRACT

A method is described for secure video processing. The method comprises storing an encrypted video stream (1) in a public stream buffer (2) in public memory accessible by a central processing unit (4) and allocating a private stream buffer (6) at a buffer location in private memory which is accessible by a decryption unit (10), wherein the private memory is not accessible for the central processing unit (4). The method then comprises decrypting the encrypted video stream (1) in the public stream buffer (2) to the private stream buffer (6) at the allocated buffer location (8) in private memory as an associated decrypted video stream (5); appending the allocated buffer location (8) to the public stream buffer (2); and configuring a video decoder unit (12) to read the decrypted video stream (5) from the private stream buffer (6) at the buffer location (8) for further processing.

7 Claims, 2 Drawing Sheets

(56) References Cited

U.S. PATENT DOCUMENTS

Figure 1:
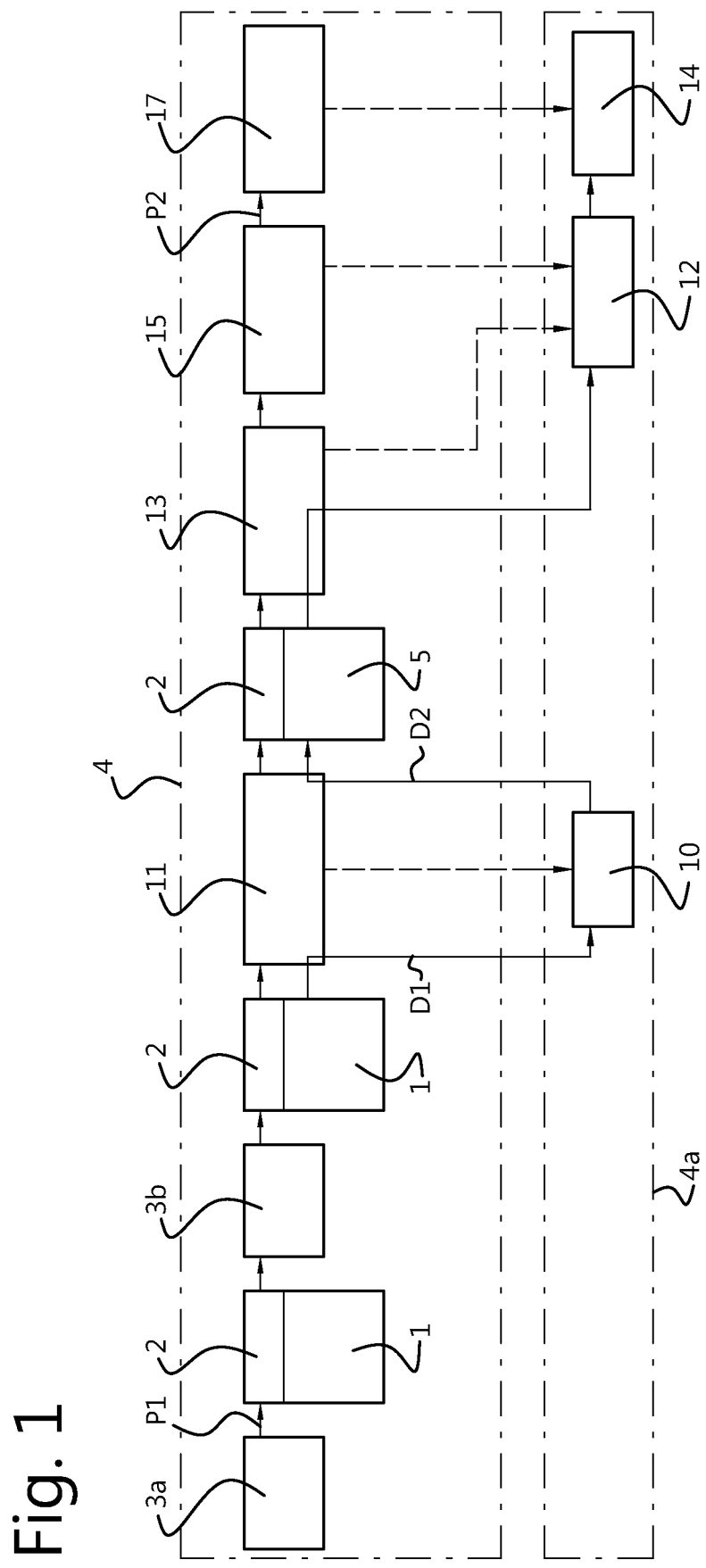

2016/0070887 A1* 3/2016 Wu .................. H04N 21/44055
  713/189
2016/0098544 A1* 4/2016 Kim ........................ G06F 21/10
  380/203

* cited by examiner

METHOD AND DEVICE FOR SECURE VIDEO PROCESSING

FIELD OF THE INVENTION

The present invention relates to a method for streaming media content, in particular to a method for secure video processing, such as secure processing of high resolution video (4 K/UHD). In a further aspect the present invention relates to a device for secure video processing.

BACKGROUND ART

Patent application US 2014/0053186 discloses an information appliance device having a transport central processing unit connected with a security processing unit and a host central processing unit. The transport central processing unit is configured to provide access to the message by the security processing unit but to prohibit access to the message by the host central processing unit.

US patent application US 2016/0070887 A1 discloses a hardware-protected DRM system including a trusted layer and untrusted layer. In the untrusted layer, a control module receives source media data that includes encrypted media data. The control module processes metadata about the media data. The metadata, possibly exposed by a module in the trusted layer, is not opaque within the untrusted layer. In the trusted layer, using key data, a module decrypts encrypted media data, which can be the encrypted media data from the source media data or a transcrypted version thereof. A module in the trusted layer decodes the decrypted media data. A host decoder in the untrusted layer uses the metadata to manage at least some aspects of the decoding, rendering and display in the trusted layer, without exposure of decrypted media data or key data within the untrusted layer.

SUMMARY OF THE INVENTION

The present invention seeks to provide a method for streaming media content, in particular a method for secure video processing of an encrypted video stream, wherein the method provides an additional layer of security for video streams that have been decrypted and are to be further processed. The method of the present invention is capable of expanding existing methods that sequentially process media streams through a buffer pipeline architecture wherein various functional elements sequentially operate in the buffer pipeline for specific processing tasks.

According to the present invention, a method as described in the preamble above is provided comprising storing an encrypted video stream in a public stream buffer in public memory which is accessible by a central processing unit, and allocating a private stream buffer at a buffer location in private memory which is accessible by a decryption unit, wherein the private memory is not accessible for the central processing unit. The method step further comprises configuring the decryption unit to decrypt the encrypted video stream as stored in the public stream buffer and to output the associated decrypted video stream to the private stream buffer at the allocated buffer location in private memory. The method continues by appending the allocated buffer location to the public stream buffer and sending the buffer location, as appended to the public stream buffer, to a video decoder unit having access to the private memory, and configuring the video decoder unit to read the decrypted video stream from the private stream buffer at the buffer location for further processing. The step of appending the buffer location to the public stream buffer subsequently comprises passing the public stream buffer to a video filter element being executed on the central processing unit, wherein the video filter element is arranged to configure the video decoder unit. Then prior to sending the buffer location as appended to the public stream buffer to the video decoder unit, the method further comprises verifying existence of the buffer location in the public stream buffer by the video filter element.

The method of the present invention allows a private stream buffer to be allocated in private memory at some buffer location therein, wherein the private memory is not accessible for the central processing unit. In particular, the encrypted video stream is decrypted and the decrypted video stream is subsequently stored in the private stream buffer at the allocated buffer location. The buffer location on the other hand is stored in the public stream buffer. The decrypted video stream is then accessible through configuration of the video decoder unit based on the buffer location. Most importantly, the decrypted video stream is not accessible by or made available to the central processing unit and a such an added layer of security is provided to decrypted media content.

SHORT DESCRIPTION OF DRAWINGS

Figure 2:
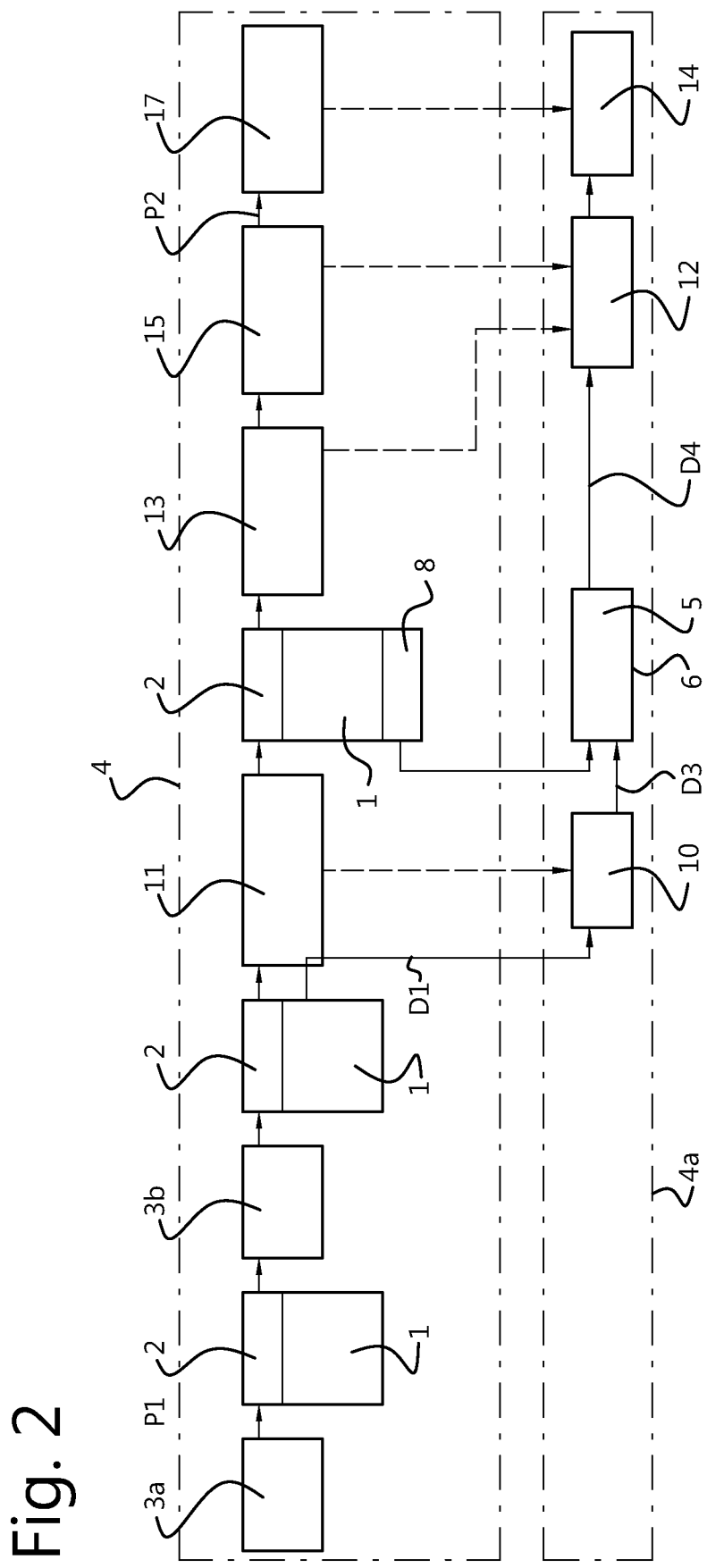

The present invention will be discussed in more detail below, with reference to the attached drawings, in which FIG. 1 shows a schematic view of a method for video processing according to a prior art embodiment; and FIG. 2 shows a schematic view of a method according to an embodiment of the present invention.

DETAILED DESCRIPTION OF EMBODIMENTS

Due to increased demand for high quality media content, such as UHD/4 K video content, content providers have shown an interest in having additional security requirements for processing and streaming media content to consumer devices such as television or home cinema sets. For example, media content provided by content providers is mostly offered as encrypted media content, wherein decryption is carried out by a locally arranged device, such as a set top box. However, even though media content is offered in encrypted form, the device responsible for decrypting and streaming the media content may be hacked or otherwise compromised, so that unlawful access to decrypted media content becomes an issue.

In view of the above, the present invention seeks to prevent unlawful access to decrypted media content by providing an additional layer of security thereto.

Reference is made to FIG. 1 showing a schematic view of a method for video processing according to a prior art embodiment. In the prior art embodiment shown, video processing is accomplished through a buffer pipeline architecture of mostly sequential operations performed by a plurality of functional elements 3a, 3b, 11, 13, 15, 17, each of which operate on a public or non-secure accessible stream buffer 2 residing in public memory, which is accessible by a central processing unit 4 or central processing hardware 4. The arrows p1 to p2 as shown in FIG. 1 indicate a main flow direction of the buffer pipeline and the public stream buffer 2 along the various functional elements 3a, 3b, 11, 13, 15, 17 operating thereon.

The method as schematically depicted in FIG. 1 allows for video processing and comprises the step of storing an encrypted video stream 1 in a public stream buffer 2 in public memory, which is accessible by a central processing unit 4. In the embodiment shown, an HTTP element 3a is typically responsible for receiving/downloading the encrypted video stream 1 comprising audio/video data from an internet based server unit. Once downloaded and stored in the public stream buffer 2, a "demultiplexer" element 3b, or "demux" element 3a for short, receives the public stream buffer 2 comprising the encrypted video stream 1. The demux element 3b is typically configured to extract the audio/video data from some container such as an MP4 container as part of the encrypted video stream 1. Without loss of generality and for clarity purposes, the extracted audio/video data is still to be considered as an encrypted video stream 1.

The method then proceeds as the demux element 3a passes the public stream buffer 2 comprising the encrypted video stream 1 to a decryption element 11, also arranged along the pipeline p1 to p2, wherein the decryption element 11 is arranged to configure a hardware based decryption unit 10 to decrypt the encrypted video stream 1 as stored in the public stream buffer 2 and output the associated decrypted video stream 5 back into the public stream buffer 2. This decryption process is schematically and conceptually performed along a configuration path D1 toward the decryption unit 10 and back again along a decryption path D2 to the public stream buffer 2 in public memory.

The method then continues with a step wherein the decryption element 11 passes the public stream buffer 2, now comprising the decrypted video stream 5, to a video filter element 13 in the buffer pipe line. The video filter element 13 is arranged to configure a hardware or software based video decoder unit 12 to read the decrypted video stream 5 from the public stream buffer 2 for further processing. Note that the video filter element 13 may pass the public stream buffer 2 with the decrypted video stream 5 to a video decoder element 15 instead, which has access to the public stream buffer 2 as well. Further steps of the method comprise passing the public stream buffer 2 to a video sink element 17, which is arranged to configure a hardware based video render unit 14 for rendering the decrypted video stream 5.

The prior art method as outlined above relies heavily on mere encryption of media content in the form of an encrypted video stream 1 in a public stream buffer 2 passing along the HTTP element 3a, demux element 3b, a decryption element 11 and subsequently along the video filter element 13, wherein the public stream buffer 2 now comprises the decrypted video stream 5, which is accessible by the central processing unit 4.

Because the decrypted video stream 5 resides in the public stream buffer 2 at some point in the buffer pipeline, it may be possible to gain unlawful access to this decrypted content through hacking. For example, given a local device such as a set top box arranged to execute the above prior art method, unlawful access to the decrypted video stream 5 may be possible when the set top box is hacked or otherwise compromised whereby the central processing unit 4 receives unexpected instructions to access the public stream buffer 2.

According to the present invention it is possible to add a further layer of protection to streaming media content by altering the way in which a decrypted video stream 5 is handled and processed.

FIG. 2 shows a schematic view of a method according to an embodiment of the present invention. In the embodiment shown, use is made of a buffer pipeline as indicated by the arrows p1 to p2 similar to the buffer pipeline as depicted in FIG. 1. The method for secure video processing starts with the step of storing an encrypted video stream 1 in a public stream buffer 2 in public memory which is accessible by a central processing unit 4. In an embodiment an HTTP element 3a may be used to download the encrypted video stream 1 and to pass the public stream buffer 2 with the encrypted video stream 1 to a demux element 3b to extract audio/video data from some container as outlined earlier.

To add the added layer of security, the method comprises the step of allocating a private stream buffer 6 at a buffer location in private memory which is accessible by a decryption unit 10, e.g. a hardware based decryption unit 10. However, this private memory is not accessible for or to the central processing unit 4. Note that the depicted boundary 4a represents in schematic fashion hardware 4a other than the central processing unit 4.

The method then proceeds by configuring the decryption unit 10 to decrypt the encrypted video stream 1 as stored in the public stream buffer 2 and to output the associated decrypted video stream 5 to the private stream buffer 6 at the allocated buffer location in private memory. A further method step then comprises attaching or appending the allocated buffer location 8 to the public stream buffer 2.

As is clear from FIG. 2, at this stage the allocated private stream buffer 6 in private memory comprises the decrypted video stream 5, whereas the public stream buffer 2 in public memory merely comprises the allocated buffer location 8 at which the decrypted video stream 5 is stored in private memory. The encrypted video stream 1 on the other hand is still considered to reside in the public stream buffer 2.

The method continues by sending/passing the buffer location 8 as attached to the public stream buffer 2 to a video decoder unit 12 which has access to the private memory. Like the decryption unit 10, the video decoder unit 12 may be hardware based.

As a final step, the method comprises configuring the video decoder unit 12 to read the decrypted video stream 5 from the private stream buffer 6 at the buffer location 8 for further processing.

When comparing the methods in FIG. 1 and FIG. 2, it is evident that the method of the present invention avoids storing the decrypted video stream 5 in the public stream buffer 2 which is accessible by the central processing unit 4. Instead, a private stream buffer 6 is allocated in private memory at some buffer location 8 therein, wherein the private memory is not accessible for the central processing unit 4. Then the encrypted video stream 1 is decrypted and the decrypted video stream 5 is stored in the private stream buffer 6 at the allocated buffer location 8. The buffer location 8 on the other hand is stored in the public stream buffer 2 and sent to the video decoder unit 12 such that it can be configured to retrieve the actual decrypted video stream 5 from the private stream buffer 6.

According to the method of the present invention it is therefore possible to provide an additional layer of security by denying the central processing unit 4 direct access to a decrypted video stream 5. The only way to access the decrypted video stream 5 is through the video decoder unit 12 which, contrary to the central processing unit 4, does have access to the private stream buffer 6 with the decrypted video stream 5.

In an advantageous embodiment, further technical information on the decrypted video stream 5 can be managed when the step off attaching the buffer location 8 to the public stream buffer 2 further comprises attaching or appending a meta structure (SVP meta data) to the public stream buffer 2, wherein the meta structure comprises the buffer location 8 but also size information of the decrypted video stream 5 stored in the private stream buffer 6. This embodiment then provides more information to efficiently configure the video decoder unit 12 for retrieving the decrypted video stream 5 from the private stream buffer 6.

With regard to the actual decryption process, an embodiment is provided wherein the step of configuring the decryption unit 10 to decrypt the encrypted video stream 1 as stored in the public stream buffer 2 comprises the step of configuring the decryption unit 10 to copy the encrypted video stream 1, possibly through direct memory access (DMA), and to decrypt the copied encrypted video stream 1, but wherein the encrypted video stream 1 is retained in the public stream buffer 2. So in case the public stream buffer 2 is unlawfully accessed by the central processing unit 4, then this embodiment denies access to the decrypted video stream 5 as the encrypted video stream 1 is merely copied and the resulting decrypted video stream 5 does not reside in the public stream buffer 2 but in the private stream buffer 6 instead.

Further optimization on allocating a private stream buffer 6 may be provided by an embodiment wherein the step of allocating a private stream buffer 6 at a buffer location in private memory comprises requesting a private stream buffer 6 at a buffer location in private memory by a decryption element 11 being executed on the central processing unit 4. In this embodiment, and as depicted in FIG. 2, the decryption element 11 is part of the buffer pipeline from p1 to p2 and receives and operates on the public stream buffer 2 comprising the decrypted video stream 1. Once the private stream buffer 6 and the buffer location are allocated as requested by the decryption element 11, the buffer location 8 can be attached or appended to the public stream buffer 2.

In a further embodiment, the step of configuring the decryption unit 10 to decrypt the encrypted video stream 1 and to output the associated decrypted video stream 5 to the private stream buffer 6 at the allocated buffer location in private memory is performed by the decryption element 11. This embodiment maintains some parts of the familiar buffer pipeline processing of a public stream buffer 2 but provides a surprising solution to the added security requirement, wherein the decryption unit 10 is configured through the decryption element 11 in such a way that the decrypted video stream 5 is stored in the private stream buffer 6, thereby denying access by the central processing unit 4. In an even further embodiment, the step of attaching or appending the buffer location 8 to the public stream buffer 2 is performed by the decryption element 11.

From the above is seen that the decryption element 11 operates on the public stream buffer 2 in a surprising way through alternative configuration of the decryption unit 10, i.e. giving rise to the configuration path D1 toward the decryption unit 10, e.g. hardware based decryption unit 10, but providing an alternative decryption path D3 to the private stream buffer 6 in private memory, wherein the buffer location 8 (or meta structure as outlined above) is stored in the public stream buffer 2.

To maintain buffer pipeline processing, an embodiment is provided wherein the step of attaching or appending the buffer location 8 to the public stream buffer 2 subsequently comprises passing the public stream buffer 2 to a video filter element 13 being executed on the central processing unit 4. In this embodiment it is clear that the public stream buffer 2 comprises the buffer location 8 and not the decrypted video stream 5, so at this step of the method the central processing unit 4 still has no access to the decrypted video stream 5.

In an embodiment, the video filter element 13 may further operate on the public stream buffer 2 as the step of sending/passing the buffer location 8 as attached to the public stream buffer 2 to the video decoder unit 12 is performed by the video filter element 13. This embodiment allows the buffer location 8 to be retrieved from the public stream buffer 2 by the video filter element 13 such that the video decoder unit 12 can be made aware of the location of the private stream buffer 6 within the private memory.

To read the decrypted video stream 5 by the video decoder unit 12, a retrieval path D3 exists between the private stream buffer 6 and the video decoder unit 12. For example, in a further embodiment the step of configuring the video decoder unit 12 to read or retrieve the decrypted video stream 5 from the private stream buffer 6 at the buffer location 8 is performed by the video filter element 13. Therefore, the video filter element 13 as part of the buffer pipeline is able to configure the video decoder unit 12 to access the private stream buffer 6 and to read/retrieve the decrypted video stream 5 for further processing. Moreover, there is no involvement of the central processing unit 4 when the decrypted video stream 5 is read from the private stream buffer 6 by the video decoder unit 12.

Up to this point it has been assumed that a buffer location 8 actually exists in the public stream buffer 2 prior to sending/passing the buffer location 8 to the video decoder unit 12, which in some instances need not be the case. Then to make the method more robust to deviations of media content in the public stream buffer 2, an embodiment is provided wherein prior to sending/passing the buffer location 8 as attached to the public stream buffer 2 to the video decoder unit 12, the method comprises verifying existence of the buffer location 8 in the public stream buffer 2 by the video filter element 13. In this embodiment it is possible to revert back to standard video processing in case no buffer location 8 (or meta structure) is found in the public stream buffer 2. Such a lack a buffer location could indicate that a decrypted video stream 5 resides in the public stream buffer 2 instead. The video decoder unit 12 may then be configured in familiar fashion as outlined in FIG. 1, wherein the video decoder unit 12 reverts back to reading the decrypted video stream 5 from the public stream buffer 2.

As mentioned hereinabove, content providers often request additional security requirements when processing and streaming high quality media (4 K/UHD) to consumer devices such as television or home cinema sets. To meet this special need an advantageous embodiment is provided wherein the encrypted video stream 1 comprises ultra-high definition/4 K video content. A decrypted high definition video stream 5 is then retrievable from the private stream buffer 6 only, ensuring that the decrypted stream is not accessible for the central processing unit 4.

In a further aspect the present invention relates to a device or set top box which is configured for secure video processing through performing the steps of the method of the present invention. For that purpose the device or set top box comprises a central processing unit 4 connected to public memory, a video decoder unit 12 connected to the public memory and private memory, wherein the private memory is not accessible for the central processing unit 4, and a decryption unit 10 connected to the public and the private memory, wherein the device or set top box is arranged and configured to store an encrypted video stream 1 in a public stream buffer 2 in the public memory, which is accessible by the central processing unit 4, allocate a private stream buffer 6 at a buffer location in the private memory, which is accessible by the decryption unit 10, configure the decryption unit 10 to decrypt the encrypted video stream 1 as stored in the public stream buffer 2 and output the associated decrypted video stream 5 to the private stream buffer 6 at the allocated buffer location in private memory, append the allocated buffer location 8 to the public stream buffer 2, send/pass the buffer location 8 as appended to the public stream buffer 2 to the video decoder unit 12 having access to the private memory; and configure the video decoder unit 12 to read the decrypted video stream 5 from the private stream buffer 6 at the buffer location 8 for further processing. Subsequently to appending the buffer location (8) to the public stream buffer (2), the device is further arranged and configured to pass the public stream buffer (2) to a video filter element (13) being executed on the central processing unit (4), the video filter element 13 being arranged to configure the video decoder unit (12), and prior to sending/passing the buffer location (8) as appended to the public stream buffer (2) to the video decoder unit (12), to verify existence of the buffer location (8) in the public stream buffer (2) by the video filter element (13)

The device or set top box according to the present invention thus provides the additional security offered by the method described hereinabove as a decrypted video stream 5 will not be available in the public stream buffer 2 but in a private stream buffer 6 instead, which cannot be accessed by the central processing unit 4. A buffer location of the private stream buffer 6 is stored in a public stream buffer 2, wherein the buffer location is sent to the (hardware based) video decoder unit 12 to be configured for accessing the private stream buffer 6, thereby avoiding exposure of the decrypted video stream 5 to the central processing unit 4.

The present invention has been described above with reference to a number of exemplary embodiments as shown in the drawings. Modifications and alternative implementations of some parts or elements are possible, and are included in the scope of protection as defined in the appended claims.

The invention claimed is:

1. A method for secure video processing, the method comprising storing an encrypted video stream in a public stream buffer in public memory which is accessible by a central processing unit;

allocating a private stream buffer at a buffer location in private memory which is accessible by a decryption unit, wherein the private memory is not accessible for the central processing unit;

decrypting, by the decryption unit, the encrypted video stream as stored in the public stream buffer and output the associated decrypted video stream to the private stream buffer at the allocated buffer location in private memory;

appending the allocated buffer location to the public stream buffer;

sending the buffer location as appended to the public stream buffer to a video decoder unit having access to the private memory;

wherein the step of appending the buffer location to the public stream buffer comprises appending a meta structure to the public stream buffer, the meta structure comprising the buffer location and size information of the decrypted video stream in the private stream buffer;

wherein the step of appending the meta structure to the public stream buffer subsequently comprises passing the public stream buffer to a video filter element being executed on the central processing unit, the video filter element being arranged to configure the video decoder unit, and wherein the method further comprises verifying existence of the buffer location in the public stream buffer by the video filter element, and if the buffer location exists, sending the buffer location as appended to the public stream buffer to the video decoder unit by the video filter element, and reading, by the video decoder unit, the decrypted video stream from the private stream buffer at the buffer location for further processing, otherwise reading, by the video decoder unit, decrypted video stream data from the public stream buffer.

2. The method according to claim 1, wherein the step off decrypting, by the decryption unit, the encrypted video stream as stored in the public stream buffer comprises copying, by the decryption unit the encrypted video stream and decrypt the copied encrypted video stream, and retaining the encrypted video stream in the public stream buffer.

3. The method according to claim 1, wherein the step of allocating a private stream buffer at a buffer location in private memory comprises requesting a private stream buffer at a buffer location in private memory by a decryption element being executed on the central processing unit.

4. The method according to claim 3, wherein the step of decrypting, by the decryption unit, the encrypted video stream, and to output the associated decrypted video stream to the private stream buffer at the allocated buffer location in private memory, is performed by the decryption element.

5. The method according to claim 3, wherein the step of appending the buffer location to the public stream buffer is performed by the decryption element.

6. The method according to claim 1, wherein the encrypted video stream comprises ultra-high definition video content.

7. A device for secure video processing, comprising a central processing unit connected to public memory, a video decoder unit connected to the public memory and private memory, wherein the private memory is not accessible for the central processing unit, and a decryption unit connected to the public and private memory, wherein the device is arranged and configured to store an encrypted video stream in a public stream buffer in public memory, which is accessible by the central processing unit;

allocate a private stream buffer at a buffer location in the private memory, which is accessible by a decryption unit;

decrypt, by the decryption unit, the encrypted video stream as stored in the public stream buffer and output the associated decrypted video stream to the private stream buffer at the allocated buffer location in private memory;

append the allocated buffer location to the public stream buffer;

send the buffer location as appended to the public stream buffer to a video decoder unit having access to the private memory; and wherein appending the buffer location to the public stream buffer comprises appending a meta structure to the public stream buffer, the meta structure comprising the buffer location and size information of the decrypted video stream in the private stream buffer, wherein appending the meta structure to the public stream buffer subsequently comprises passing the public stream buffer to a video filter element being executed on the central processing unit, the video filter element being arranged to configure the video decoder unit, wherein the device is further arranged and configured to verify existence of the buffer location in the public stream buffer by the video filter element, and if the buffer location exists, send the buffer location as appended to the public stream buffer to the video decoder unit by the video filter element and read, by the video decoder unit, the decrypted video stream from the private stream buffer at the buffer location for further processing, otherwise read, by the video decoder unit, decrypted video stream data from the public stream buffer.

* * * * *